2 Sheets. Sheet 1.

S. A. Bailey.
Clothes Wringers.

No. 1,710. Reissued June 28, 1864.

Witnesses;
A. P. Midgley
Robt. McC. Lord.

Inventor;
S. A. Bailey

2 Sheets. Sheet 2.

S. A. Bailey,
Clothes Wringers.

No 1,710. Reissued June 28, 1864.

Witnesses;
A. Van Wyck
Robt. M. C. Lord

Inventor;
S. A. Bailey

UNITED STATES PATENT OFFICE.

SELDON A. BAILEY, SIMEON S. COOK, AND BENEDICT M. COOK, OF WOONSOCKET, R. I, ASSIGNEES, BY MESNE ASSIGNMENTS, OF S. H. BAILEY.

IMPROVED MACHINE FOR WRINGING CLOTHES.

Specification forming part of Letters Patent No. 23,436, dated April 5, 1859; Reissue No. 1,710, dated June 28, 1864.

*To all whom it may concern:*

Be it known that S. A. BAILEY, of New London, in the county of New London and State of Connecticut, did invent certain new and useful Improvements in Machines for Wringing Clothes; and we do hereby declare that the following is a full, clear, and exact description of the same, reference being had to the accompanying drawings, and to the letters of reference marked thereon.

Figure 1:
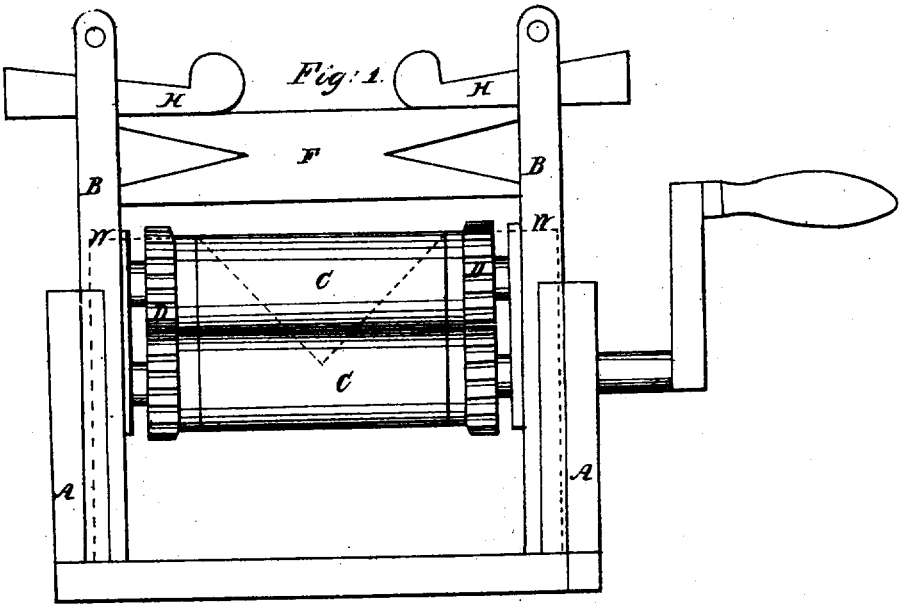
Figure 3:
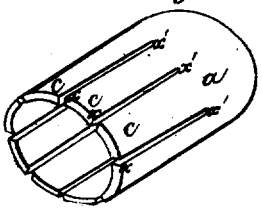
Figure 4:
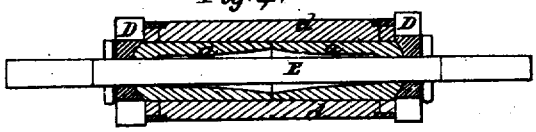
Figure 2:
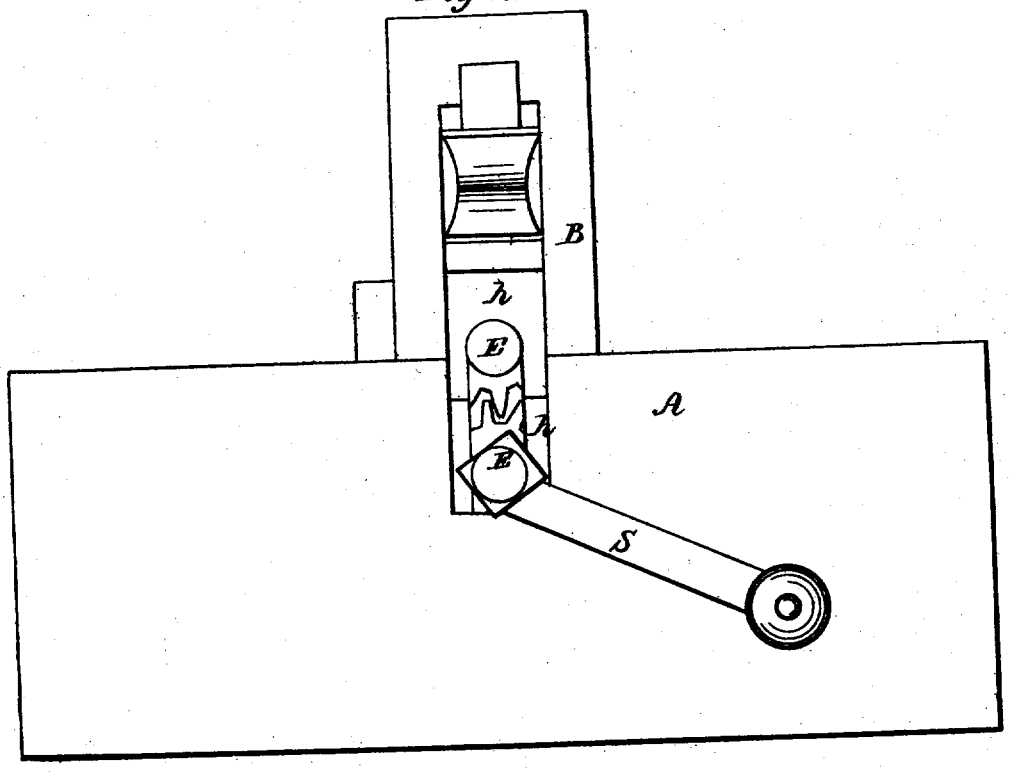

Figure 1 is an end view of the machine with one end removed. Fig. 2 is a side view. Fig. 3 is a perspective of one-half of the wooden spring. Fig. 4 is a longitudinal section of one of the rollers.

In the figures, A represents the box, which is rectangular. From the sides of said box are erected two perpendicular supports, B B, said supports being constructed with a rectangular slot or groove through them, in which the journal-bearings *h h* are allowed to move up and down freely. C C represent two cylinders, through which pass the shafts E E, said shafts having their bearings in the journal-boxes *h h*. The cylinder C is seen in section in Fig. 4.

*a a* represent a cylindrical wooden spring piece which passes over the shaft E. This piece is divided transversely at its center, as is shown, and its two sections are provided with a conical bore, the bases of the cones being placed together. These conical holes extend to almost the outward ends of the piece *a*, are slotted from their place of division toward their outer ends, as from X to X′. In Fig. 3, *c c c* are the slats formed by thus slotting those pieces. These holes are much thicker at X′ than they are at X, and the consequence is that when the piece *a* is placed or slipped over the shaft E it will act as a spring, which yields at its center, but does not at its ends. *d d* represent a cylindrical piece of india-rubber which passes over the wooden spring-piece *a*.

D D represent gear-wheels, which are secured on the shaft E. These gear-wheels are beveled on their sides which are presented to the piece *a*, and the outer ends of the piece *a* are also beveled to correspond with the bevel of the gear-wheels and fit in said gear-wheels, as is shown in Fig. 4.

F is a bar which rests above the journal-boxes *h h*, the ends of said bar bearing upon blocks placed upon the boxes *h h*. A V-shaped piece is cut out of the ends of the bar F, so that when the boxes *h h* bear heavily against its ends they will yield slightly.

H H represent wedges which are placed over the bar F for the purpose of keeping it down and for pressing the cylinders tighter together. *m m* (seen in dotted line) is a guide for directing the clothes toward the center of the cylinders.

In wringing clothes with the machine they are passed between the rollers *c c* by turning the handle S, the cylinders being close together, and a sufficient pressure is obtained for small articles. A corresponding pressure is obtained for large ones, as it requires much force to bear in the spring-slats *c c c* when articles of large bulk pass through.

We form by this method a spring-roller, by means of which we can obtain more pressing force at less cost than we can by any other mode.

We are aware that a patent has been granted to Mr. Alender for a machine which employs a roller which yields at its center, but we disclaim all such parts of his invention as may be found in this machine, confining ourselves to the device and arrangement above described.

Having thus fully described said invention, what we claim as new, and desire to secure by Letters Patent, is—

1. The employment of the cylindrical wooden spring-piece *a a*, which is divided in two parts at its center, each part being slotted from the place of division, as shown in the drawings, toward A's outer end, the same being covered by rubber cylinder, substantially in the manner and for the purpose specified.

2. The spring F, in combination with elastic rollers, for the purpose set forth.

S. A. BAILEY,
SIMEON S. COOK.
BENEDICT M. COOK,
*Assignees of S. A. Bailey, patentee.*

Witnesses:
H. J. RAMSDELL,
D. E. SOMES.